F. F. FORSHEE.
CONTROL SYSTEM FOR ELECTRIC RANGES.
APPLICATION FILED MAR. 1, 1920.

1,416,009.

Patented May 16, 1922.

WITNESSES:

INVENTOR
Frank F. Forshee
BY
ATTORNEY

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF MICHIGAN.

CONTROL SYSTEM FOR ELECTRIC RANGES.

1,416,009.   Specification of Letters Patent.   Patented May 16, 1922.

Application filed March 1, 1920. Serial No. 362,425.

*To all whom it may concern:*

Be it known that I, FRANK F. FORSHEE, a citizen of the United States, and a resident of Flint, in the county of Genesee and State of Michigan, have invented a new and useful Improvement in Control Systems for Electric Ranges, of which the following is a specification.

My invention relates to electrically-heated apparatus and particularly to automatic electric ranges, and it has for its object to provide a new method for automatically controlling the supply of energy to such ranges.

In automatic electric ranges now on the market, the circuit is closed by means of a time - controlled mechanism and is interrupted by means of thermally - controlled mechanism when the temperature in the oven reaches a predetermined value. The temperature in such oven is thus first raised to a predetermined value and is then allowed to drop again, no special provision being made to keep the temperature at any desired value for any predetermined length of time.

In practicing my invention, I provide a second heating element of relatively high resistance which may be connected in series-circuit relation with the usual heating element of relatively low resistance by means of thermally - actuated means. The usual time-controlled circuit-closing and interrupting mechanism may be so combined with the above circuit as to obtain the following results:

The circuit may be energized at a predetermined time and may be totally de-energized after a predetermined time interval.

The circuit may be energized at a predetermined time and the temperature of the oven raised to a predetermined value, when the supply of energy may be reduced to a value just sufficient to maintain that temperature for any desired length of time.

Figure 1:
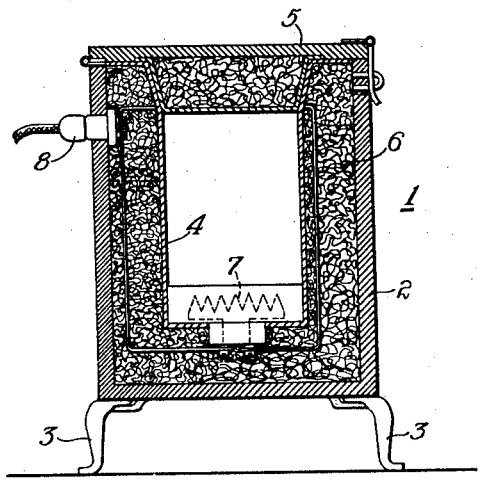
Figure 2:
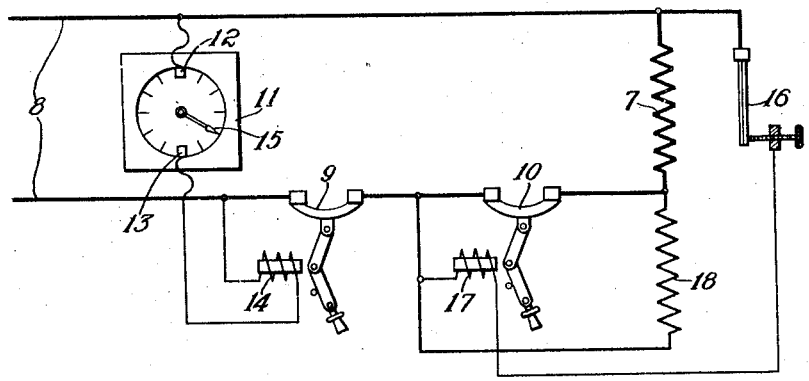

In the single sheet of drawings, Figure 1 is a view, in vertical cross-section, of an electric cooking apparatus in which the circuit embodying my invention may be used, and Fig. 2 is a diagrammatic representation of a circuit embodying my invention.

An electric cooking apparatus 1 comprises an outer box 2, suitable supporting members 3, an inner chamber 4, and a cover member 5. Between the inner chamber 4 and the outer box 2 is a layer of heat-insulating material 6. Suitable provision is made for connecting a resistor 7 to a source of electric energy, as by means of a connecting plug-and-socket member 8. While I have shown a specific device, I desire it to be understood that this is illustrative only, as the circuit embodying my invention may be applied to, and used with, any kind of electric range.

Referring to Fig. 2, a supply circuit 8 energizes a main heating element 7 through two circuit-interrupting devices 9 and 10 which are connected in series-circuit relation. A clock 11 is arranged to actuate the device 9 to close or to interrupt the circuit, adjustable contact members 12 and 13 being provided to close and to interrupt a circuit through an actuating coil 14 of the device 9. The arrangement of the circuits in the clock 11 is such that a circuit is closed when the hand 15 operatively engages the contact member 12 and this circuit remains closed until the hand 15 operatively engages the contact member 13 and interrupts the circuit, after which the circuit remains interrupted until the hand again engages the contact member 12. The circuit - interrupting device 9 may be manually operated, if desired, but is usually to be operated by the clock.

A second electromagnetic switch 10 is connected in series-circuit relation to the switch 9 and is actuated by an adjustable thermostat 16 which closes or interrupts a control circuit through a coil 17 of the switch 10, the terminals of the control circuit being connected to the conductors of the supply circuit 8.

A second heating element 18 has one of its terminals connected to one of the terminals of the main heating element 7 and has its other terminal connected to one of the conductors of the supply circuit 8 between the two switches 9 and 10.

If it is desired to conduct a relatively low-temperature long-time cooking operation, we may proceed as follows: Adjust the thermostat 16 to close its circuit at the desired temperature and close the switch 10. If it is desired to energize the main heating element 7 at once, the contact member 12 may be so moved as to be operatively engaged by the hand 15, which will cause the switch 14 to be closed and the element 7 to be energized. The temperature of the inner chamber 4 and of food placed therein is raised until the desired value is reached, whereupon the thermostat 16 will operate to close its control circuit. This causes the switch 10 to open and the current from the circuit 8 to traverse the element 18 in series-circuit relation with the main heating element 7. The energy lost in the heating elements 7 and 18 in the oven is thus reduced and, by proper selection of the resistance of the element 18, the amount of energy lost may be made just sufficient to maintain the temperature at substantially the desired value. If desired, the contact member 13 may be so adjusted as to be operatively engaged by the hand 15 after a desired time interval and cause the total de-energization of the heating elements. As the heat-insulating material 6 around the chamber 4 may be made relatively thick and thus effectively retain the heat generated by the heating elements, it is possible to maintain substantially any desired value of temperature in the chamber 4 with but one value of energy lost in the combined heating elements 18 and 7.

If it is desired to heat an article of food placed in the chamber 4 to a relatively high temperature, then to reduce the energy input or even interrupt the circuit and continue the cooking operation by means of the stored heat, the thermostat 16 may be adjusted to operate at the desired higher temperature and the contact member 12 adjusted to cause the heating element 7 to be energized at the desired time. As soon as the desired temperature has been reached, the thermostat 16 operates to close its control circuit, the switch 10 opens and the supply of energy is reduced. If previous experiments have shown the length of time required to raise the temperature of the chamber 4 and a given quantity of food, to a certain value, the "off" contact member 13 may be so adjusted with relation to the "on" contact member 12 as to cause the circuit to be interrupted after such time interval.

I thus provide relatively simple means for controlling the temperature of a heat-insulated chamber over a relatively wide range of values and for maintaining the temperature at a predetermined value for any desired period of time.

Various modifications may be made in the method embodying my invention without departing from the spirit and scope thereof, and I desire that only such limitations shall be placed thereon as are imposed by the prior art or are specifically set forth in the appended claims.

I claim as my invention:

1. In an electrically-heated apparatus, the combination with a main electric heating element, of a circuit-controlling device for said main heating element, chronometrically-controlled means for actuating said circuit-controlling device, an auxiliary electric heating element, and means comprising a thermally-actuated device for permitting the energization of said auxiliary electric heating element in series-circuit relation with said main heating element.

2. In an electrically-heated apparatus, the combination with a heat-insulated chamber, a main heating element and an auxiliary heating element permanently connected in series-circuit relation with each other, of chronometrically-controlled means for initially energizing said main heating element only, and thermostatic controlling means for permitting the energizing of both of said heating elements at a predetermined temperature.

3. In an electrically-heated apparatus, the combination with a main heating element and an auxiliary heating element permanently connected in series circuit relation with each other, of a plurality of switching means connected in series-circuit relation with each other and with the main heating element, one of said switching means being connected in parallel-circuit relation with said auxiliary heating element, chronometrically-controlled actuating means for causing one of said switching means to energize the main heating element and to de-energize both the main and the auxiliary heating element, and thermally-responsive means for causing the second of said switching means to permit the energization of both of said heating elements simultaneously.

4. In an electrically-heated apparatus, the combination with a heat-insulated chamber and a main heating element associated therewith, of a switching means for said main heating element, a chronometric device for controlling said switching means to energize said main heating element at predetermined times and for predetermined periods of time, a second switching means connected in series-circuit relation with said first switching means, thermostatic actuating means for said second switching means, and an auxiliary heating element so connected to said main-heating element and said switching means that the opening of said second switching means causes the energization of said auxiliary heating element in series-circuit relation with said main heating element.

5. In an electrically heated apparatus, the combination with a chamber, a main heating element and an auxiliary heating element permanently connected in series-circuit relation with each other and located in said chamber, of a switch connected in series-circuit relation with the main heating element and in shunt-circuit relation with the auxiliary heating element, a second switch connected in series-circuit relation to both heating elements, chronometic means for actuating said second switch and a thermostat for actuating said first switch to its open position to permit of energizing both said heating elements simultaneously.

6. In an electrically heated apparatus, the combination with a heat-insulated chamber, a main and an auxiliary heating element permanently connected in series-circuit relation with each other and means for normally rendering the auxiliary heating element inoperative, of time-controlled means for initially permitting the energization of said main heating element only, and a temperature-responsive device for actuating said first means to render said auxiliary heating element operative.

7. In an electrically heated apparatus, the combination with a heat-insulated chamber, a main heating element and a normally inoperative auxiliary heating element permanently connected in series-circuit relation with said main heating element, of a time controlled switch for initially permitting the energization of said main heating element only and temperature - controlled means for rendering said auxiliary heating element operative.

8. An electrically heated apparatus comprising a heat-insulated chamber, a main heating element and an auxiliary heating element in said chamber and permanently connected in series-circuit relation with each other and an electromagnetically operated switch for normally short circuiting the auxiliary heating element, of a time-controlled switch for initially energizing said main heating element only and a thermostat for actuating said electromagnetic switch to its open position.

9. In an electrically heated apparatus, the combination with a heat-insulated chamber, a main heating element of relatively low resistance, and a time-controlled switch for initially permitting the energization of said main heating element only, of an auxiliary heating element of relatively high resistance permanently connected in series-circuit relation with said main heating element, an electromagnetic switch connected in series-circuit relation with said time-controlled switch and in shunt-circuit relation with said auxiliary heating element and adapted to normally short circuit the same, and temperature-controlled means for actuating said electromagnetic switch to permit of energizing both of said heating elements simultaneously.

10. In an electrically heated apparatus, the combination with an oven chamber, and a main heating element of relatively high capacity adapted to quickly raise the temperature of said chamber, and a time-controlled switch for permitting the energization of said main heating element, of an auxiliary heating element permanently connected in series-circuit relation with said main heating element, a second switch connected in series-circuit relation with said first switch and in shunt-circuit relation with said auxiliary heating element and normally adapted to short circuit said auxiliary heating element, and means operative at a predetermined temperature for actuating said second switch to its open position and for permitting both of said heating elements being energized simultaneously to maintain said predetermined temperature.

11. In an electrically heated apparatus, in combination, a main heating element, a normally inoperative auxiliary heating element permanently connected in series-circuit relation with said main heating element, a time controlled switch for initially permitting the energization of said main heating element only and temperature controlled means for rendering said auxiliary heating element operative.

In testimony whereof, I have hereunto subscribed my name this 25 day of Feb., 1920.

FRANK F. FORSHEE.